United States Patent
Webster et al.

(10) Patent No.: US 8,430,622 B2
(45) Date of Patent: Apr. 30, 2013

(54) TURBOFAN GAS TURBINE ENGINE

(75) Inventors: John Richard Webster, Derby (GB);
Kenneth Franklin Udall, Derby (GB);
James Martin Townsend, Derby (GB)

(73) Assignee: Rolls-Royce PLC (GB)

( * ) Notice: Subject to any disclaimer, the term of this patent is extended or adjusted under 35 U.S.C. 154(b) by 1566 days.

(21) Appl. No.: 11/938,980

(22) Filed: Nov. 13, 2007

(65) Prior Publication Data

US 2008/0181763 A1     Jul. 31, 2008

(30) Foreign Application Priority Data

Dec. 6, 2006  (GB) ................................. 624363.8

(51) Int. Cl.
*F01D 25/00*  (2006.01)
*F01D 25/16*  (2006.01)

(52) U.S. Cl.
USPC .............................................. 415/9; 415/142

(58) Field of Classification Search ............. 415/9, 142, 415/229
See application file for complete search history.

(56) References Cited

U.S. PATENT DOCUMENTS

| | | | | |
|---|---|---|---|---|
| 4,201,513 A * | 5/1980 | Sales | ................................. | 416/2 |
| 4,451,110 A | 5/1984 | Forestier et al. | | |
| 4,452,567 A * | 6/1984 | Treby et al. | ....................... | 416/2 |
| 4,496,252 A | 1/1985 | Horler et al. | | |
| 4,770,725 A * | 9/1988 | Simpson et al. | ............. | 148/402 |
| 5,259,183 A * | 11/1993 | Debeneix | ....................... | 60/797 |
| 5,941,683 A * | 8/1999 | Ridyard et al. | ............... | 415/142 |
| 6,079,200 A * | 6/2000 | Tubbs | .......................... | 60/226.1 |
| 6,082,959 A * | 7/2000 | Van Duyn | .......................... | 415/9 |
| 6,109,022 A * | 8/2000 | Allen et al. | ..................... | 60/223 |
| 6,240,719 B1 * | 6/2001 | Vondrell et al. | ................. | 60/223 |
| 6,402,469 B1 * | 6/2002 | Kastl et al. | ........................ | 416/2 |
| 6,428,269 B1 * | 8/2002 | Boratgis et al. | ................... | 415/9 |
| 6,428,634 B1 * | 8/2002 | Besselink et al. | ............ | 148/421 |
| 6,494,032 B2 * | 12/2002 | Udall et al. | ..................... | 60/223 |
| 6,779,963 B2 * | 8/2004 | Kang | ................................ | 415/1 |
| 6,796,408 B2 * | 9/2004 | Sherwin et al. | ............... | 188/378 |
| 6,799,416 B2 * | 10/2004 | Plona et al. | ..................... | 60/223 |
| 7,025,560 B2 * | 4/2006 | Clark | ................................ | 415/9 |
| 7,097,412 B2 * | 8/2006 | DiTomasso | ...................... | 415/9 |
| 7,097,413 B2 * | 8/2006 | VanDuyn | .......................... | 415/9 |

(Continued)

FOREIGN PATENT DOCUMENTS

DE         2514055 A1    3/1975
GB         2033495 A     8/1979

(Continued)

*Primary Examiner* — Nathaniel Wiehe
*Assistant Examiner* — Sean J Younger
(74) *Attorney, Agent, or Firm* — McCormick, Paulding & Huber LLP

(57) ABSTRACT

In a turbofan gas turbine engine, a fan shaft is rotatably mounted and radially supported by a bearing in a bearing support structure supported from a fixed engine structure by radially frangible bolts and radially extending spokes. The radially inner ends of the radially extending spokes are mounted on a common member that engages the bearing support structure. The radially outer ends of the radially extending spokes are mounted on a fixed engine structure located radially outwardly of the bearing support structure. The radially extending spokes are held in tension and include a super elastic material to exert a radially inward restoring force on the bearing support structure, subsequent to any radial excursion of at least part of the fan shaft relative to an engine rotational axis (X) following any fracture of the frangible bolts.

11 Claims, 5 Drawing Sheets

U.S. PATENT DOCUMENTS

| | | | | |
|---|---|---|---|---|
| 7,153,091 B2 * | 12/2006 | Stephenson et al. | ............... | 415/9 |
| 7,195,444 B2 * | 3/2007 | Brault et al. | ........................ | 415/9 |
| 7,404,678 B2 * | 7/2008 | Plona | ............................ | 384/624 |
| 7,448,845 B2 * | 11/2008 | Stephenson et al. | ............... | 415/9 |
| 7,669,799 B2 * | 3/2010 | Elzey et al. | ............... | 244/123.12 |
| 7,946,808 B2 * | 5/2011 | Taylor et al. | ................ | 415/173.7 |

FOREIGN PATENT DOCUMENTS

| | | |
|---|---|---|
| GB | 2310258 A | 2/1997 |
| JP | 9269005 A | 4/1996 |
| JP | 11082498 A | 9/1997 |
| JP | 2005098460 A | 9/2003 |
| RU | 2241841 C2 | 11/2002 |

* cited by examiner

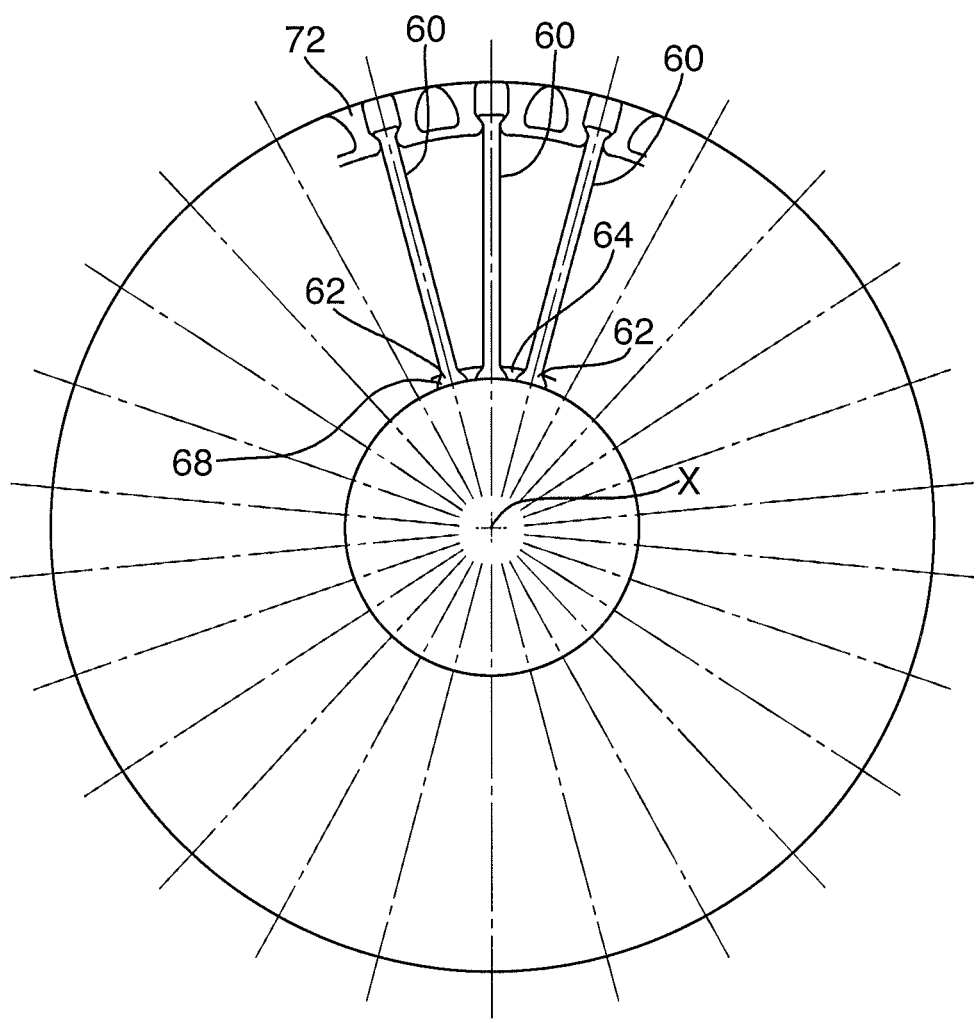

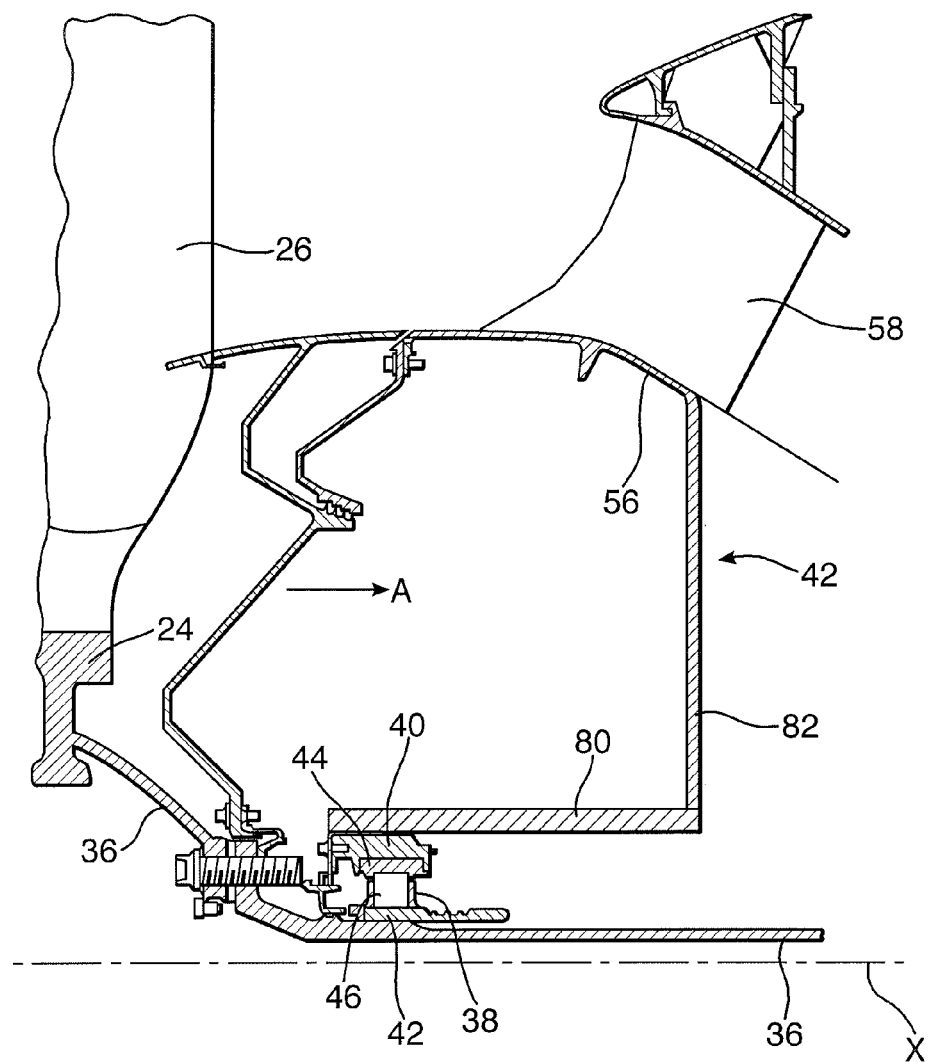

TURBOFAN GAS TURBINE ENGINE

CROSS-REFERENCE TO RELATED APPLICATION

This application is entitled to the benefit of British Patent Application No. GB 0624363.8 filed on Dec. 6, 2006.

FIELD OF THE INVENTION

The present invention relates to turbofan gas turbine engines, generally and in particular, to a turbofan gas turbine engine with a fan shaft frangible connection.

BACKGROUND OF THE INVENTION

Turbofan gas turbine engines are used for powering aircraft and comprise a relatively large diameter fan, which is driven by a core engine. The fan is vulnerable to damage as a result of foreign objects entering the turbofan gas turbine engine. In most cases, the fan is sufficiently robust to withstand the effects of such foreign object ingestion without suffering major damage and is able to continue operating, although, perhaps, at reduced efficiency.

On very rare occasions, the fan may be damaged to such an extent that parts of one or more of the fan blades that make up the fan are lost. This usually necessitates shutting down of the turbofan gas turbine engine involved to minimise the hazard to the aircraft carrying it. However, the imbalance in the fan created by the fan blade loss initially generates extremely high loads, which must, at least partially, be absorbed as the gas turbine engine is allowed to run-down to windmilling speed. Windmilling speed is the speed at which the gas turbine engine rotates in a non-operative condition as a result of its motion through the atmosphere.

The transients following the fan blade loss produce massive loads and distortion of the bearing housing for the fan bearing and also in surrounding structure.

One way in which the fan imbalance load absorption may be achieved is to ensure that the relevant engine structures are sufficiently strong to tolerate the very high loads involved.

However, this results in a heavily reinforced structure both in the engine and aircraft, which results in an increase in weight of the engine and aircraft.

Other ways in which the fan imbalance load absorption may be achieved is to provide energy absorbing links and deforming housings.

Again, this results in an increase in weight of the engine and aircraft and the movement of the energy absorbing links or deforming housings results in permanent deformation of the structure and does not give a stiff structure to control shaft/rotor dynamics during windmilling.

SUMMARY OF THE INVENTION

Accordingly, the present invention seeks to provide a novel turbofan gas turbine engine, which reduces, preferably, overcomes the above-mentioned problem.

Accordingly, the present invention provides a turbofan gas turbine engine comprising a fan mounted on a fan shaft, the fan shaft being normally coaxial with said engine rotational axis, the fan shaft being rotatably mounted and radially supported by a bearing in a bearing support structure, the bearing support structure being supported from a fixed structure of the engine by at least one member, a first end of the at least one member engaging the bearing support structure and a second end of the member being mounted on the fixed structure, the at least one member comprising a super elastic material, the at least one member exerting a radially inward restoring force on the bearing support structure, and hence the fan shaft, subsequent to any radial excursion of at least part of the fan shaft relative to the rotational axis of the engine.

Preferably, the at least one member comprising at least one generally radially extending member, the radially inner end of the at least one radially extending member being mounted on a common member, the common member engaging the bearing support structure, the radially outer end of the at least one radially extending member being mounted on fixed structure of the engine located radially outwardly of the bearing support structure, the at least one radially extending member being held in tension, the at least one radially extending member exerting a radially inward restoring force on the bearing support structure, and hence the fan shaft, subsequent to any radial excursion of at least part of the fan shaft relative to the rotational axis of the engine.

Preferably, the bearing support structure being supported from fixed structure of the engine by a radially frangible connection means, the at least one radially extending member exerting a radially inward restoring force on the bearing support structure, and hence the fan shaft, subsequent to any radial excursion of at least part of the fan shaft relative to the rotational axis of the engine following any fracture of the frangible connection means.

Preferably, the at least one radially extending member comprises a plurality of generally radially extending spokes, the radially inner ends of the radially extending spokes being mounted on a common member, the common member engages the bearing support structure, the radially outer ends of the radially extending spokes being mounted on fixed structure of the engine located radially outwardly of the bearing support structure, the radially extending spokes being held in tension.

Preferably, the radially inner ends of the radially extending spokes are dovetail shaped in cross-section and engage dovetail shaped slots in the common member.

Preferably, the radially outer ends of the radially extending spokes are dovetail shaped in cross-section and engage dovetail shaped slots in the fixed structure.

Alternatively, the at least one radially extending member comprises at least one disc or at least one cone.

Alternatively, the at least one member comprising at least one generally axially extending member, a first axial end of the at least one axially extending member engaging the bearing support structure, a second axial end of the at least one axially extending member being mounted on fixed structure of the engine, the at least one axially extending member exerting a radially inward restoring force on the bearing support structure, and hence the fan shaft, subsequent to any radial excursion of at least part of the fan shaft relative to the rotational axis of the engine.

The at least one axially extending member may comprise at least one drum or at least one beam.

Preferably, the super elastic material comprises a super elastic metal.

Preferably, the super elastic metal comprises a shape memory metal.

Preferably, the shape memory metal comprises Ni—Ti alloy.

Alternatively, the super elastic metal comprises Ti—Nb alloy.

BRIEF DESCRIPTION OF THE DRAWINGS

FIG. 3 shows a view in the direction of arrow A of the bearing support structure shown in FIG. 2.

FIG. 6 shows an alternative schematic enlarged cross-sectional view of a portion of a further fan rotor and a bearing support structure according to the present invention.

DETAILED DESCRIPTION OF THE PREFERRED EMBODIMENTS

Figure 1:
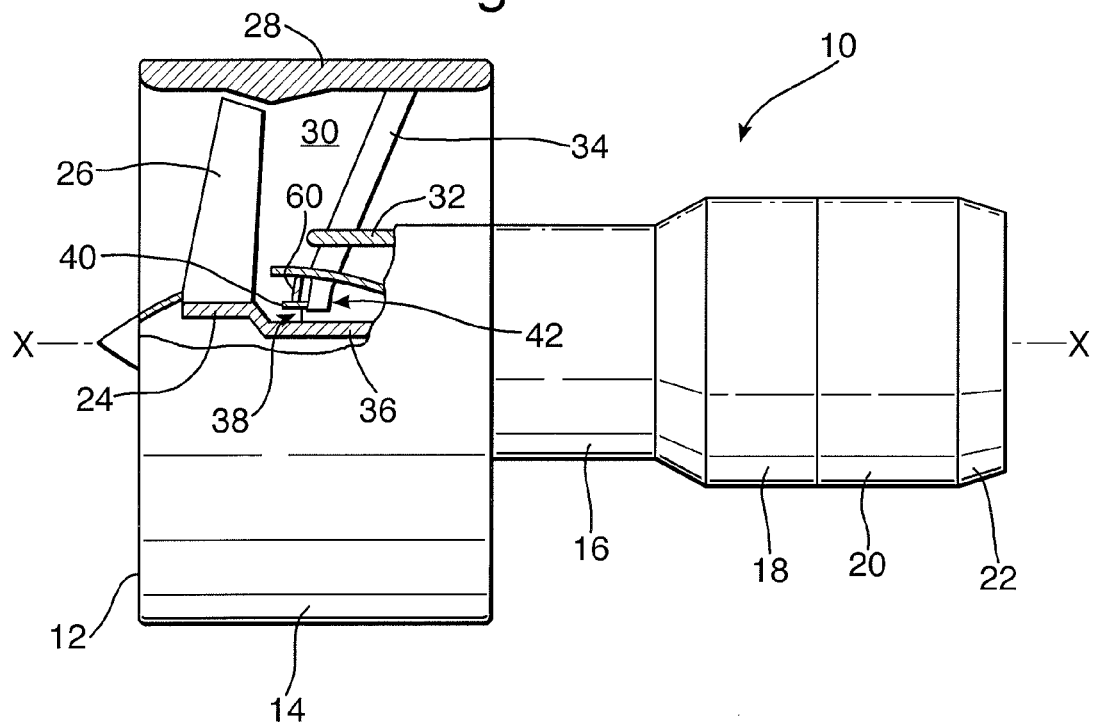
FIG. 1 shows a turbofan gas turbine engine according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The fan section 14 comprises a fan, which includes a fan rotor 24 carrying a plurality of circumferentially spaced radially outwardly extending fan blades 26. The fan rotor 24 and fan blades 26 are surrounded by a fan casing 28 to define a fan duct 30. The fan casing 28 is supported from a core engine casing 32 by a plurality of circumferentially spaced radially extending fan outlet guide vanes 34. The compressor section 16 comprises an intermediate-pressure compressor (not shown) and a high-pressure compressor (not shown) or a high-pressure compressor (not shown). The turbine section 20 comprises a high-pressure turbine (not shown), an intermediate-pressure turbine (not shown) and a low-pressure turbine (not shown) or a high-pressure turbine (not shown) and a low-pressure turbine (not shown). The low-pressure turbine is arranged to drive the fan via a fan shaft 36, the intermediate-pressure turbine is arranged to drive the intermediate-pressure compressor via a shaft (not shown) and the high-pressure turbine is arranged to drive the high-pressure compressor via a shaft (not shown).

Figure 2:
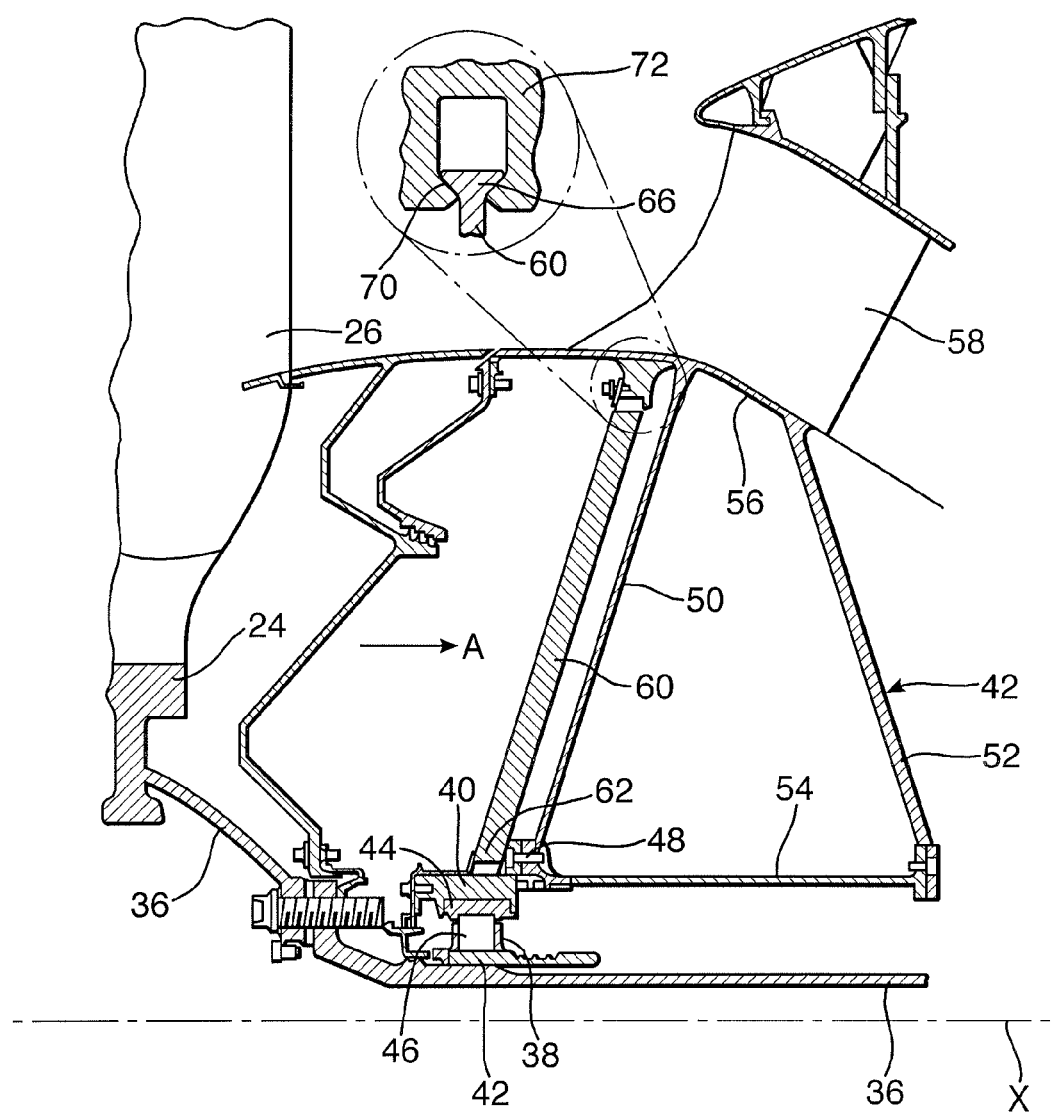
FIG. 2 shows an enlarged cross-sectional view of a portion of a fan rotor and a bearing support structure according to the present invention.

The fan is supported from fixed structure of the turbofan gas turbine engine 10 as is shown more clearly in FIGS. 2 and 3. The fan, the fan rotor 24 is mounted on the fan shaft 36 and the fan shaft 36 is normally coaxial with the rotational axis X of the turbofan gas turbine engine 10.

The fan shaft 36 is rotatably mounted and radially supported by a number of roller bearings spaced axially along the fan shaft 36. A roller bearing 38 axially adjacent the fan rotor 24 is supported in a bearing support structure 40. The roller bearing 38 comprises a radially inner race 42 on a radially outer surface of the fan shaft 36, a radially outer race 44 and a plurality of roller elements 46 between the inner race 42 and the outer race 44. The radially outer race 44 is supported by the bearing support structure 40.

The bearing support structure 40 is supported from fixed structure 42 of the turbofan gas turbine engine 10 by a radially frangible connection, for example a plurality of frangible axially extending bolts 48. The fixed structure 42 comprises two annular panels 50 and 52, which are axially spaced at their radially inner ends by a cylindrical member 54 and the radially outer ends of the annular panels 50 and 52 are connected by an annular member to define the radially inner platforms 56 of a set of stator vanes 58. The stator vanes 58 are secured at their radially outer ends to the core engine casing 32.

In addition, a plurality of equally circumferentially spaced generally radially extending spokes 60 are provided, the radially inner ends 62 of the radially extending spokes 60 are mounted on a common member 64 and the common member 64 engages the radially outer periphery of the bearing support structure 40. The radially outer ends 66 of the radially extending spokes 60 are mounted on the fixed structure 42 of the turbofan gas turbine engine 10 located radially outwardly of the bearing support structure 40. The radially extending spokes 60 are held in tension and the radially extending spokes 60 comprise a super elastic material. The super elastic material comprises a super elastic metal, for example a shape memory metal e.g. Ni—Ti shape memory metal or gum metal, e.g. a Ti—Nb alloy. Other suitable super elastic metals may be used.

The radially inner ends 62 of the radially extending spokes 60 are dovetail shaped in cross-section and engage dovetail shaped slots 68 in the common member 64. The radially outer ends 66 of the radially extending spokes 60 are dovetail shaped in cross-section and engage dovetail shaped slots 70 in a ring member 72 forming part of the fixed structure 42.

The generally radially extending spokes 60 as shown in FIGS. 2 and 3 are arranged at an angle to a plane arranged perpendicular to the rotational axis X of the turbofan gas turbine engine 10 and the radially outer ends of the spokes 60 are arranged axially downstream from the radially inner ends of the spokes. The generally radially extending spokes 60 are arranged in a plane containing the rotational axis X of the turbofan gas turbine engine 10.

In the event of the fan suffering damage to one or more of the fan blades 26, which places the fan significantly out of balance, considerable radial loads are transmitted from the fan shaft 36 to the bearing support structure 40 via the roller bearing 38. These loads are then transmitted to the fixed structure 42 via the frangible bolts 48. However, in order to protect the core engine from being seriously damaged by the radial loads, the frangible bolts 48 are designed to be frangible in such a manner that they fracture in shear when subjected to loads above a predetermined load. If this occurs, the upstream end of the fan shaft 36 no longer has radial support and so it proceeds to orbit around the rotational axis X of the turbofan gas turbine engine 10.

Figure 4:
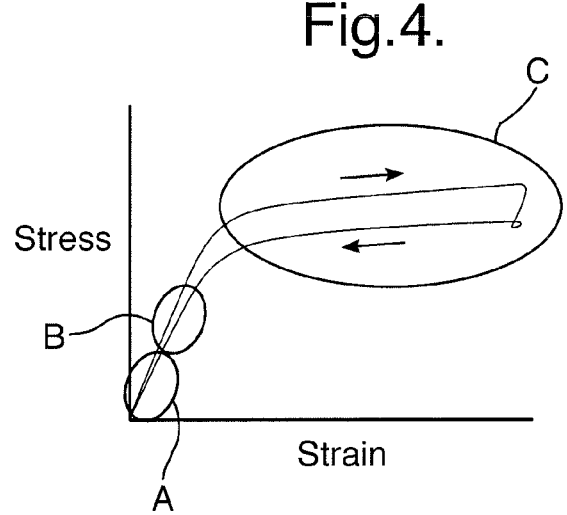
FIG. 4 is a graph of stress against strain for a super elastic material.

However, the radially extending spokes 60 via the common member 64 exert a radially inward restoring force on the bearing support structure 40, and hence on the fan shaft 36, subsequent to any radial excursion of at least part of the fan shaft 36 relative to the rotational axis X of the turbofan gas turbine engine following any fracture of the frangible bolts 48. The radially extending spokes 60 have high strain and energy absorption and are placed in tension between their radially inner ends 62 and radially outer ends 66. The radially extending spokes 60 have very large recoverable strains, about 10%, and provide high-energy absorption and have a non-linear stress-strain curve, as shown in FIG. 4, which minimises permanent deformation and retains stiffness at low strain levels. The radially extending spokes 60 have low stiffness at high strain levels for reduction of damage during a fan blade off event, they have high energy absorption, they are lightweight and compact and have high stiffness following a fan blade off event to provide good control of the fan during windmilling. Region A on the graph is the region corresponding to normal operation of the radially extending spokes 60, region B on the graph is the region corresponding to operation of the spokes 60 during fan windmilling and region C on the graph corresponds to operation of the spokes 60 during out of balance following a fan blade off event.

Thus, the present invention provides a mounting for a fan of a gas turbine engine incorporating a super elastic material, which provides a stiff structure during normal operation, limits loads to maintain the structure during a fan blade off event, provides high energy dissipation and returns to its original shape after the fan blade off event.

Although the present invention has been described with reference to generally radially extending spokes, the spokes may be arranged such that the outer ends of the generally radially extending spokes are spaced circumferentially from the radially inner ends of the spokes, and may be arranged in a manner similar to the spokes of a bicycle wheel.

Although the present invention has been described with reference to a plurality of generally radially extending spokes it may be possible to provide at least one generally radially extending member, the radially inner end of the at least one radially extending member being mounted on a common member, the common member engaging the bearing support structure, the radially outer end of the at least one radially extending member being mounted on fixed structure of the engine located radially outwardly of the bearing support structure, the at least one radially extending member being held in tension and the at least one radially extending member comprising a super elastic material.

The generally radially extending member may comprise at least one disc or at least one cone.

Figure 5:
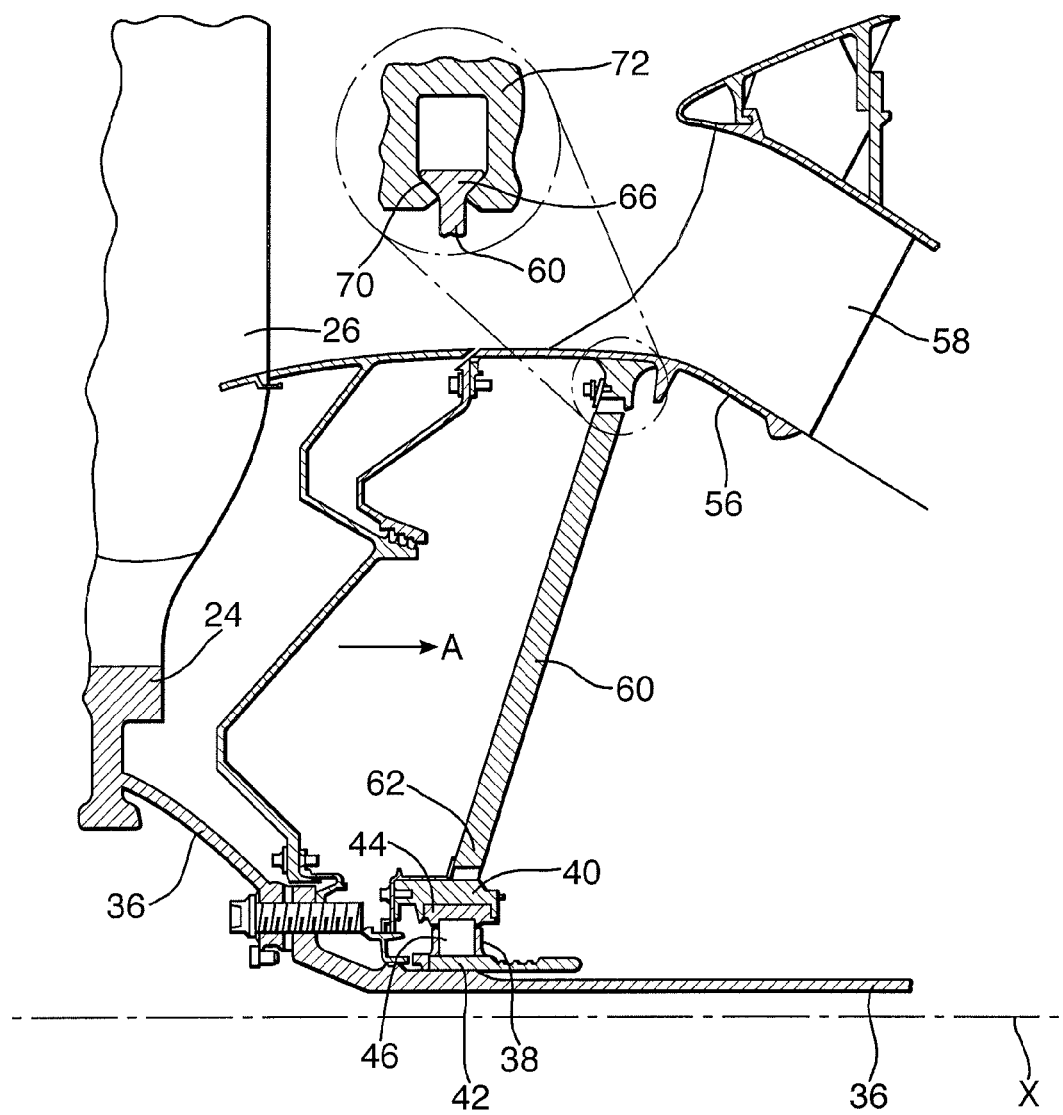
FIG. 5 shows an alternative enlarged cross-sectional view of a portion of a further fan rotor and a bearing support structure according to the present invention.

In an alternative arrangement the fan shaft 36 is supported from fixed structure of the turbofan gas turbine engine 10, as shown more clearly in FIG. 5. This arrangement is similar to FIGS. 2 and 3, but without the frangible connection, frangible bolts, and the fixed support structure comprising two annular panels secured to a cylindrical member at their radially inner ends. In this instance the radially extending spokes 60 alone provide the support between the bearing housing 40 and the stator vanes 58.

Although the present invention has been described with reference to at least one generally radially extending member, it may also be possible to provide at least one axially extending member instead of a radially extending member, e.g. a drum or a plurality of axially extending beams.

In an alternative arrangement, the fan shaft 36 is supported from fixed structure of the turbofan gas turbine engine 10 as is shown more clearly in FIG. 6. The fan, the fan rotor 24 is mounted on the fan shaft 36 and the fan shaft 36 is normally coaxial with the rotational axis X of the turbofan gas turbine engine 10.

In addition an axially extending drum 80 is provided, the axially upstream end 62 of the drum 80 engages the radially outer periphery of the bearing support structure 40. The axially downstream end of the drum 80 is mounted on the fixed structure 42 of the turbofan gas turbine engine 10 located radially outwardly of the bearing support structure 40, by the annular panel 82 etc. The drum 80 comprises a super elastic material. The super elastic material comprises a super elastic metal, for example a shape memory metal e.g. Ni—Ti shape memory alloy or gum metal e.g. Ti—Nb alloy. Other suitable super elastic metals may be used, e.g. Ti—Ni—Cu, Ti—Ni—Nb, Ti—Ni—Hf, Cu—Zn—Al, Cu—Al—Ni etc.

Similarly, although the invention has been shown and described with respect to a best mode embodiment thereof, it should be understood by those skilled in the art that various other changes, omissions and additions thereto may be made therein without departing from the spirit and scope of the invention.

We claim:

1. A turbofan gas turbine engine comprising a fan mounted on a fan shaft, the fan shaft being normally coaxial with an engine rotational axis, the fan shaft being rotatably mounted and radially supported by a bearing in a bearing support structure, the bearing support structure being supported from a fixed structure of the engine by at least one member, a first end of the at least one member engaging the bearing support structure and a second end of the member being mounted on the fixed structure, the at least one member comprising a super elastic material, the at least one member exerting a radially inward restoring force on the bearing support structure, and hence the fan shaft, subsequent to a radial excursion of at least part of the fan shaft relative to the rotational axis of the engine;

wherein the at least one member further comprises at least one generally radially extending member, a radially inner end of the at least one radially extending member being mounted on a common member, the common member engaging the bearing support structure, the radially outer end of the at least one radially extending member being mounted on the fixed structure of the engine located radially outwardly of the bearing support structure, the at least one radially extending member being held in tension, the at least one radially extending member exerting a radially inward restoring force on the bearing support structure, and hence the fan shaft, subsequent to any radial excursion of at least part of the fan shaft relative to the rotational axis of the engine;

wherein the at least one radially extending member further comprises a plurality of generally radially extending spokes, the radially inner ends of the radially extending spokes being mounted on a common member, the common member engages the bearing support structure, the radially outer ends of the radially extending spokes being mounted on fixed structure of the engine located radially outwardly of the bearing support structure, the radially extending spokes being held in tension, and the radially inner ends of the radially extending spokes are dovetail shaped in cross-section and engage dovetail shaped slots in the common member.

2. A turbofan gas turbine engine as claimed in claim 1 wherein the bearing support structure being supported from fixed structure of the engine by a radially frangible connection means, the at least one radially extending member exerting a radially inward restoring force on the bearing support structure, and hence the fan shaft, subsequent to any radial excursion of at least part of the fan shaft relative to the rotational axis of the engine following any fracture of the frangible connection means.

3. A turbofan gas turbine engine as claimed in claim 1 wherein the super elastic material comprises a super elastic metal.

4. A turbofan gas turbine engine comprising a fan mounted on a fan shaft, the fan shaft being normally coaxial with an engine rotational axis, the fan shaft being rotatably mounted and radially supported by a bearing in a bearing support structure, the bearing support structure being supported from a fixed structure of the engine by at least one member, a first end of the at least one member engaging the bearing support structure and a second end of the member being mounted on the fixed structure, the at least one member comprising a super elastic material, the at least one member exerting a radially inward restoring force on the bearing support structure, and hence the fan shaft, subsequent to a radial excursion of at least part of the fan shaft relative to the rotational axis of the engine;

wherein the at least one member further comprises at least one generally radially extending member, a radially inner end of the at least one radially extending member being mounted on a common member, the common member engaging the bearing support structure, the radially outer end of the at least one radially extending member being mounted on the fixed structure of the engine located radially outwardly of the bearing support structure, the at least one radially extending member being held in tension, the at least one radially extending member exerting a radially inward restoring force on the bearing support structure, and hence the fan shaft, subsequent to any radial excursion of at least part of the fan shaft relative to the rotational axis of the engine;

wherein the at least one radially extending member further comprises a plurality of generally radially extending spokes, the radially inner ends of the radially extending spokes being mounted on a common member, the common member engages the bearing support structure, the radially outer ends of the radially extending spokes being mounted on fixed structure of the engine located radially outwardly of the bearing support structure, the radially extending spokes being held in tension, and the radially outer ends of the radially extending spokes are dovetail shaped in cross-section and engage dovetail shaped slots in the fixed structure.

5. A turbofan gas turbine engine as claimed in claim 4 wherein the super elastic material comprises a super elastic metal.

6. A turbofan gas turbine engine as claimed in claim 5 wherein the super elastic metal comprises a shape memory metal.

7. A turbofan gas turbine engine as claimed in claim 6 wherein the shape memory metal comprises Ni—Ti alloy.

8. A turbofan gas turbine engine as claimed in claim 5 wherein the super elastic metal comprises Ti—Nb alloy.

9. A turbofan gas turbine engine as claimed in claim 5 wherein the super elastic metal is selected from the group consisting of Ti—Ni—Cu, Ti—Ni—Nb, Ti—Ni—Hf, Cu—Zn—Al and Cu—Al—Ni.

10. A turbofan gas turbine engine as claimed in claim 4 wherein the bearing support structure being supported from fixed structure of the engine by a radially frangible connection means, the at least one radially extending member exerting a radially inward restoring force on the bearing support structure, and hence the fan shaft, subsequent to any radial excursion of at least part of the fan shaft relative to the rotational axis of the engine following any fracture of the frangible connection means.

11. A turbofan gas turbine engine comprising a fan mounted on a fan shaft, the fan shaft being normally coaxial with an engine rotational axis, the fan shaft being rotatably mounted and radially supported by a bearing in a bearing support structure, the bearing support structure being supported from a fixed structure of the engine by at least one member, a first end of the at least one member engaging the bearing support structure and a second end of the member being mounted on the fixed structure, the at least one member comprising a super elastic material, the at least one member exerting a radially inward restoring force on the bearing support structure, and hence the fan shaft, subsequent to a radial excursion of at least part of the fan shaft relative to the rotational axis of the engine;

wherein the at least one member further comprises at least one generally radially extending member, a radially inner end of the at least one radially extending member being mounted on a common member, the common member engaging the bearing support structure, the radially outer end of the at least one radially extending member being mounted on the fixed structure of the engine located radially outwardly of the bearing support structure, the at least one radially extending member being held in tension, the at least one radially extending member exerting a radially inward restoring force on the bearing support structure, and hence the fan shaft, subsequent to any radial excursion of at least part of the fan shaft relative to the rotational axis of the engine;

wherein the at least one radially extending member further comprises a plurality of generally radially extending spokes, the radially inner ends of the radially extending spokes being mounted on a common member, the common member engages the bearing support structure, the radially outer ends of the radially extending spokes being mounted on fixed structure of the engine located radially outwardly of the bearing support structure, the radially extending spokes being held in tension;

wherein the radially inner ends of the radially extending spokes are dovetail shaped in cross-section and engage dovetail shaped slots in the common member;

wherein the radially outer ends of the radially extending spokes are dovetail shaped in cross-section and engage dovetail shaped slots in the fixed structure; and wherein radial gaps being formed between the dovetail shaped radially outer ends of the radially extending spokes and the radially outer ends of the corresponding dovetail shaped slots in the fixed structure.

\* \* \* \* \*